United States Patent
Qi et al.

(10) Patent No.: US 6,869,704 B1
(45) Date of Patent: Mar. 22, 2005

(54) ENHANCEMENT OF ELECTROCHEMICAL CELL PERFORMANCE

(75) Inventors: Zhigang Qi, North Arlington, NJ (US); Arthur Kaufman, West Orange, NJ (US)

(73) Assignee: H Power Corporation, Belleville, NJ (US)

( * ) Notice: Subject to any disclaimer, the term of this patent is extended or adjusted under 35 U.S.C. 154(b) by 373 days.

(21) Appl. No.: 10/092,145

(22) Filed: Mar. 5, 2002

(51) Int. Cl.[7] .............................................. H01M 8/04
(52) U.S. Cl. .......................................... 429/13; 429/12
(58) Field of Search ..................................... 429/13, 12

(56) References Cited

U.S. PATENT DOCUMENTS

| | | |
|---|---|---|
| 4,116,143 A | 9/1978 | Manabe |
| 4,876,115 A | 10/1989 | Raistrick |
| RE33,149 E | 1/1990 | Petrow et al. |
| 5,211,984 A | 5/1993 | Wilson |
| 5,723,173 A | 3/1998 | Fukuoka et al. |
| 5,728,485 A | 3/1998 | Watanabe et al. |
| 5,985,477 A * | 11/1999 | Iwasaki et al. ............... 429/33 |
| 6,174,337 B1 * | 1/2001 | Keenan ..................... 29/25.03 |
| 6,309,772 B1 | 10/2001 | Zuber et al. |
| 2001/0042682 A1 * | 11/2001 | Weres et al. ............. 204/278.5 |
| 2002/0061431 A1 * | 5/2002 | Koyama et al. ............. 429/33 |

OTHER PUBLICATIONS

Ticianelli et al, Methods to advance technology of proton exchange membrane fuel cells, J. Electrochem. Soc., pp. 2209–2214 (1998), Sep.

Poltarzewski et al, Nafion distribution in gas diffusion electrodes for solid polymeer–electrolyte–fuel–cell applications, J. Electrochem. Soc., pp. 761–765 (1992), Mar.

* cited by examiner

*Primary Examiner*—John S. Maples
(74) *Attorney, Agent, or Firm*—Mark Levy & Associates; David L. Banner

(57) ABSTRACT

Electrodes for an electrochemical cell such as a proton exchange membrane (PEM) fuel cell are treated with steam or a hot solution before they are bonded to a membrane to form a membrane-electrode assembly. Such a treatment effectively increases the performance of the electrodes when they are subsequently tested within the PEM fuel cell. Improved performance is also observed using this technique with a catalyst-coated membrane and a membrane-electrode assembly.

3 Claims, 3 Drawing Sheets

ENHANCEMENT OF ELECTROCHEMICAL CELL PERFORMANCE

FIELD OF THE INVENTION

This invention relates to electrochemical cells such as proton exchange membrane (PEM) fuel cells, direct methanol fuel cells (DMFC) and, more particularly, to an enhancement treatment of electrodes, catalyst-coated membranes, and membrane-electrode assemblies used in these types of electrochemical cells in order to improve performance.

BACKGROUND OF THE INVENTION

The performance of an electrochemical cell, such as a proton exchange membrane (PEM) fuel cell and a direct methanol fuel cell (DMFC), is largely determined by the membrane-electrode assembly (MEA). The MEA has an anode for fuel oxidation, a cathode for oxygen reduction, and an ion-conducting membrane for proton conductance.

The fuel oxidation reaction and the oxygen reduction reaction of these cells have typically slow kinetics. Therefore, catalysts such as platinum and its alloys are often used to catalyze these reactions.

Catalysts are generally made into porous layers in order to increase the surface contact area between the reactants and the catalyst particles. The layers can be applied either to the membrane or to a gas diffusion medium. A catalyst electrode (hereinafter "electrode") is fabricated by applying the layer to the gas diffusion medium. A catalyst layer that is applied to a membrane produces a catalyst-coated membrane (CCM). Normally, both sides of the membrane are coated.

In order to reduce the cost of a fuel cell, it is desirable to reduce the amount of noble metal catalysts in the catalyst layers. Initially, the minimum catalyst loading in an electrode able to provide good performance was found to be over 4.0 mg/cm$^2$. Subsequently, metal nano-particles having a higher surface area were prepared upon a carbon black support layer, as illustrated in U.S. Pat. No. 4,166,143, granted to Petrow et al on Aug. 28, 1979; 4,876,115, granted to Raistrick on Oct. 24, 1989; and Re. 33,149 granted to Petrow et al on Jan. 16, 1990.

Both electrons and protons are involved in fuel cell reactions, thus requiring both electrical, as well as proton conductivity. In a traditional MEA this will limit the reaction zone within the interface, between the catalyst layer, and the ion-conducting membrane. This interfacial region is extremely thin and the total surface area of the catalyst particles in this region is low. Therefore, the catalyst layer is unable to provide a high current density. The catalyst that is not in contact with the membrane is simply wasted.

Nafion, an ionic-conducting, perfluorinated ionomer can be incorporated into the catalyst layer to improve the current density. Incorporating Nafion into the entire catalyst layer will provide improved conduction for protons.

Nafion® can be impregnated into a catalyst layer by brushing and spraying, or by respectively floating, or dipping the electrode into a Nafion solution. Ticianelli et al, Methods to advance technology of proton exchange membrane fuel cells, J. Electrochem. Soc. pp. 2209–2214 (1988), September. Poltarzewski et al, Nafion distribution in gas diffusion electrodes for solid polymer-electrolyte-fuel-cell applications, J. Electrochem. Soc. pp 761–765 (1992), March. Applying Nafion in this way provides an opportunity to incorporate a water-repelling agent such as polytetrafluoroethylene (PTFE) into the catalyst layer. The final catalyst layer will be controllably hydrophobic and be able to reduce the likelihood of flooding. The disadvantage of this method is that it is very difficult to control the amount of Nafion applied. Therefore, it is impossible to have a homogeneous distribution of Nafion over the entire catalyst layer.

Another method of incorporating Nafion into a catalyst layer is to mix catalysts, especially supported catalysts, directly with Nafion and then use the resulting mixture to fabricate the catalyst layer, as illustrated in U.S. Pat. No. 5,211,984, granted to Wilson on May 18, 1993; 5,723,173, granted to Fukuoka et al on Mar. 3, 1998; 5,728,485, granted to Watanabe et al on Mar. 17, 1998; and 6,309,772, granted to Zuber et al on Oct. 30, 2001. Mixing the catalysts and Nafion forms a mixture providing an even distribution through the entire catalyst layer. Solvents such as glycerol may be used during the mixing in order to achieve a preferential viscosity and to hold the catalyst particles in suspension in order to minimize their agglomeration, as shown in U.S. Pat. No. 5,211,984, granted to Wilson on May 18, 1993.

Sometimes the Nafion solution is converted into a colloid suspension by adding a proper organic solvent before mixing it with the catalyst, as illustrated in U.S. Pat. No. 5,723,173, granted to Fukuoka et al on Mar. 3, 1998. It is described in this patent that colloidal Nafion forms a good network that achieves a uniform distribution with the catalyst particles.

Directly mixing the Nafion solution, or colloid suspension with the catalyst, however, makes it difficult to incorporate PTFE into the catalyst layer. This is because PTFE normally needs to be sintered at a temperature higher than 330° C. However, such a temperature will destroy Nafion. Unfortunately the catalyst layer is more likely to be flooded without the PTFE.

All these recent developments have helped to decrease the catalyst loading from 4.0 mg/cm$^2$ or more, to 0.5 mg/cm$^2$ or less. However, a fuel cell that has slightly loaded catalyst electrodes has much lower performance than a fuel cell using highly loaded catalyst electrodes. This lowered performance results from there being many catalyst sites that will not become active and are figuratively "dead." The reasons for this could be: the reactant cannot reach the catalyst sites because they are blocked; the Nafion near these catalyst sites cannot be easily hydrated; or the ionic or electronic continuity is not established at these sites. Catalyst sites that cannot participate in the electrochemical reactions are "dead".

The present invention provides a procedure and an article made by the procedure whereby catalyst utilization is enhanced significantly.

The present invention has discovered that "dead" catalyst sites can be activated by treating the catalyst layer with steam or a high temperature solution.

SUMMARY OF THE INVENTION

Despite recent advances to reduce noble and precious metal loads in the catalyst layers of fuel cells, high performance has not yet been achieved. Directly mixing a catalyst with a proton conducting material such as Nafion makes a three-dimensional catalyst layer, but many of the catalyst sites are not available for reaction. The method of this invention activates these previously "dead" catalyst sites, by treating the catalyst layers with steam or a high temperature solution. In operation, the treated catalyst layers will perform significantly better than their non-treated counterparts.

It is an object of this invention to provide a method, and an article fabricated by this method, wherein "dead" sites of catalyst layers of a fuel cell become activated.

It is another objective of this invention to provide increased catalyst activity in catalyst layers of a fuel cell by treating the electrodes with steam, or hot solution, before they are bonded onto a membrane to form an MEA.

It is yet another objective of this invention to provide increased catalyst utilization by treating CCMs and MEAs with steam, or a hot solution, before they are assembled into a cell, or fuel cell stack.

BRIEF DESCRIPTION OF THE DRAWINGS

A complete understanding of the present invention may be obtained by reference to the accompanying drawings when considered in conjunction with the subsequent detailed description, in which.

DETAILED DESCRIPTION OF THE INVENTION

Figure 1:
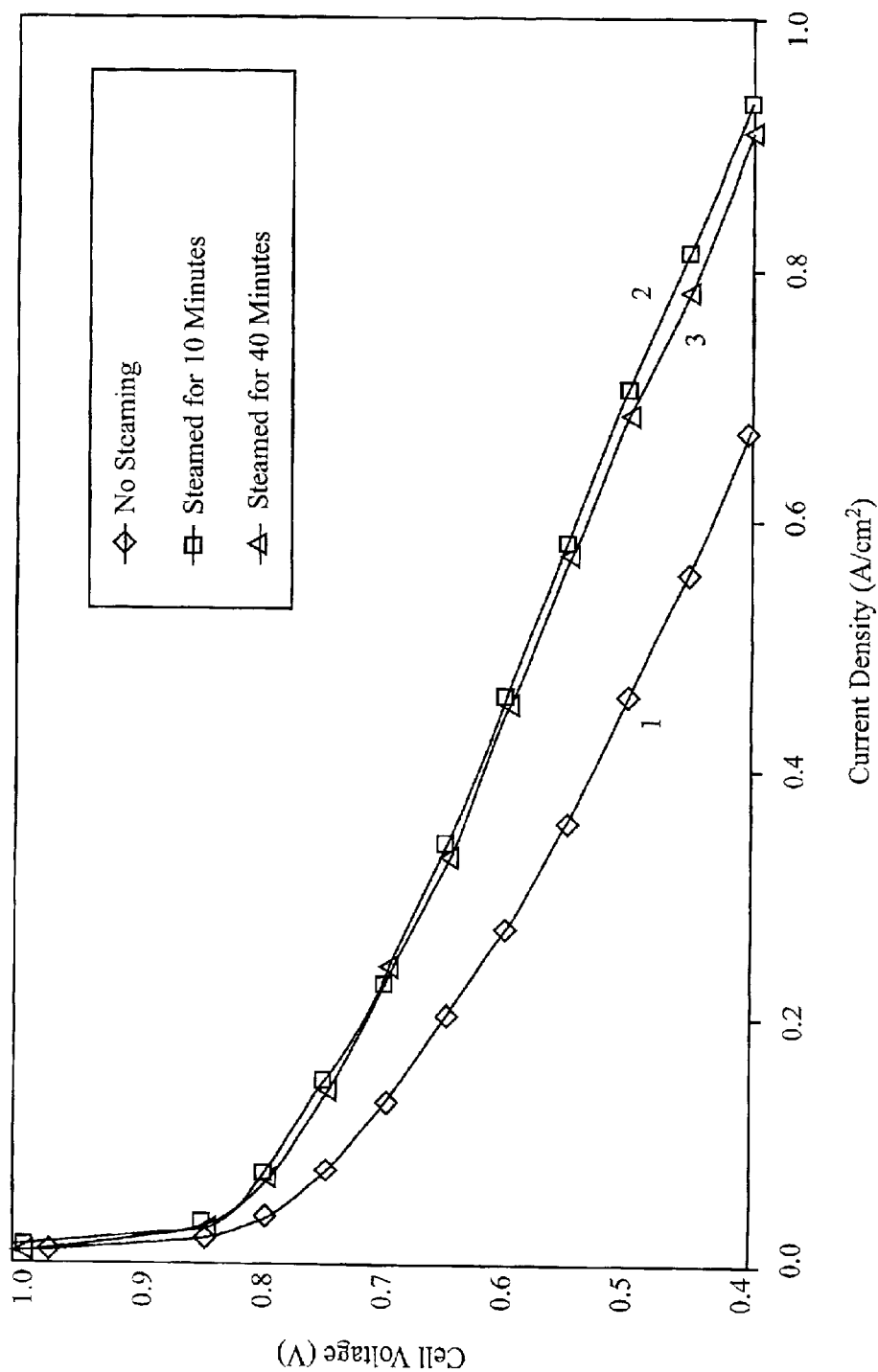
FIG. 1 shows a graph illustrating the performances of electrodes having been steamed for 0, 10 and 40 minutes, respectively.

Generally speaking, in order to make a catalyst layer active in three-dimensions, an ionic-conducting material is normally incorporated into the catalyst layer. The electrodes are then dried to remove solvents from the catalyst layers, and to make the ionic-conducting material more robust so it will not leach out during fuel cell operation. This drying process, unfortunately, dehydrates the electrode. Rehydrating the electrodes of a PEM fuel cell at elevated temperature restores the ionic conducting in the catalyst layer. This will result in maximizing the activity of the catalyst in the electrodes and improve performance of the PEM fuel cell.

Hot-bonding catalyst, electrode layers to membranes in an MEA may dehydrate them. The extent of dehydration will depend on the bonding temperature, duration, and humidity. However, most of the ionic-conducting material contained therein can regain their hydration by heat-treating them with steam or a hot solution prior to testing. Not only is the ionic-conducting material in the catalyst layer hydrated faster at the higher temperature, but it also occurs in more regions of the catalyst layer. This leads to an improved utilization of catalyst in the electrodes, resulting in enhanced fuel cell performance.

Treatment with steam or a hot solution may also open some otherwise "dead" regions in the catalyst layer.

This same procedure can also be used to treat CCMs and MEAs. When MEAs are treated, however, caution should be taken to prevent electrodes from detaching from the membrane. A slight applied pressure may be needed between the electrodes of each MEA to prevent any detachment.

EXAMPLES

A catalyst mixture was prepared by directly mixing support 20% or 40% Pt/° C. with a Nafion solution. The mixture was stirred thoroughly before it was applied to a gas diffusion medium. Carbon paper-type material was used as the anode gas diffusion medium, while ELAT, a carbon cloth impregnated with a mixture of PTFE and carbon black, was used as the cathode gas diffusion medium. After catalyst application, the electrodes were dried in an oven at 135° C., for 30 minutes. These electrodes, with or without a further treatment as described below, were hot-bonded onto Nafion 112 membranes at 130° C.

The following treatment was only applied to the cathodes because they determined the whole MEA performance when pure hydrogen was used as the fuel. The treatment was either boiling the electrodes in water or applying steam to the electrodes in a household pressure cooker (PC-806M, Revere Electronics). When boiled in water, the electrodes were floated on the surface of the water and the catalyzed side was arranged to face the water. When steamed, the electrodes were either floated in the liquid water phase, or supported by a stand so that they would only be in contact with the water vapor. Catalyst-coated membranes were also treated in a similar manner using either hot water or steam.

MEAs or CCMs were tested using a 10 $cm^2$ single cell. The cell consisted of serpentine flow-fields disposed upon metal nitride-coated plates. Tests were performed at ambient pressure, with a cell temperature of 35° C., using hydrogen and air that were humidified at 45° C. by being passed through water bottles.

Now referring to FIG. 1, the effect of steaming upon electrode performance is illustrated. The cathode catalyst layers were made of 20% Pt/C, with a Pt loading of 0.11 $mg/cm^2$. Compared to the non-steamed electrode (Curve 1), electrodes that were steamed for 10 minutes (Curve 2) and 40 minutes (Curve 3), exhibited much higher performance throughout the entire voltage region. For example, at a cell voltage of 0.60 V, the non-steamed electrode had a current density of 0.28 $A/cm^2$, while both of the steamed electrodes had a current density of 0.44 $A/cm^2$ (a 57% increase). The two steamed electrodes performed similarly indicating that steaming for only 10 minutes was sufficient to improve performance.

Figure 2:
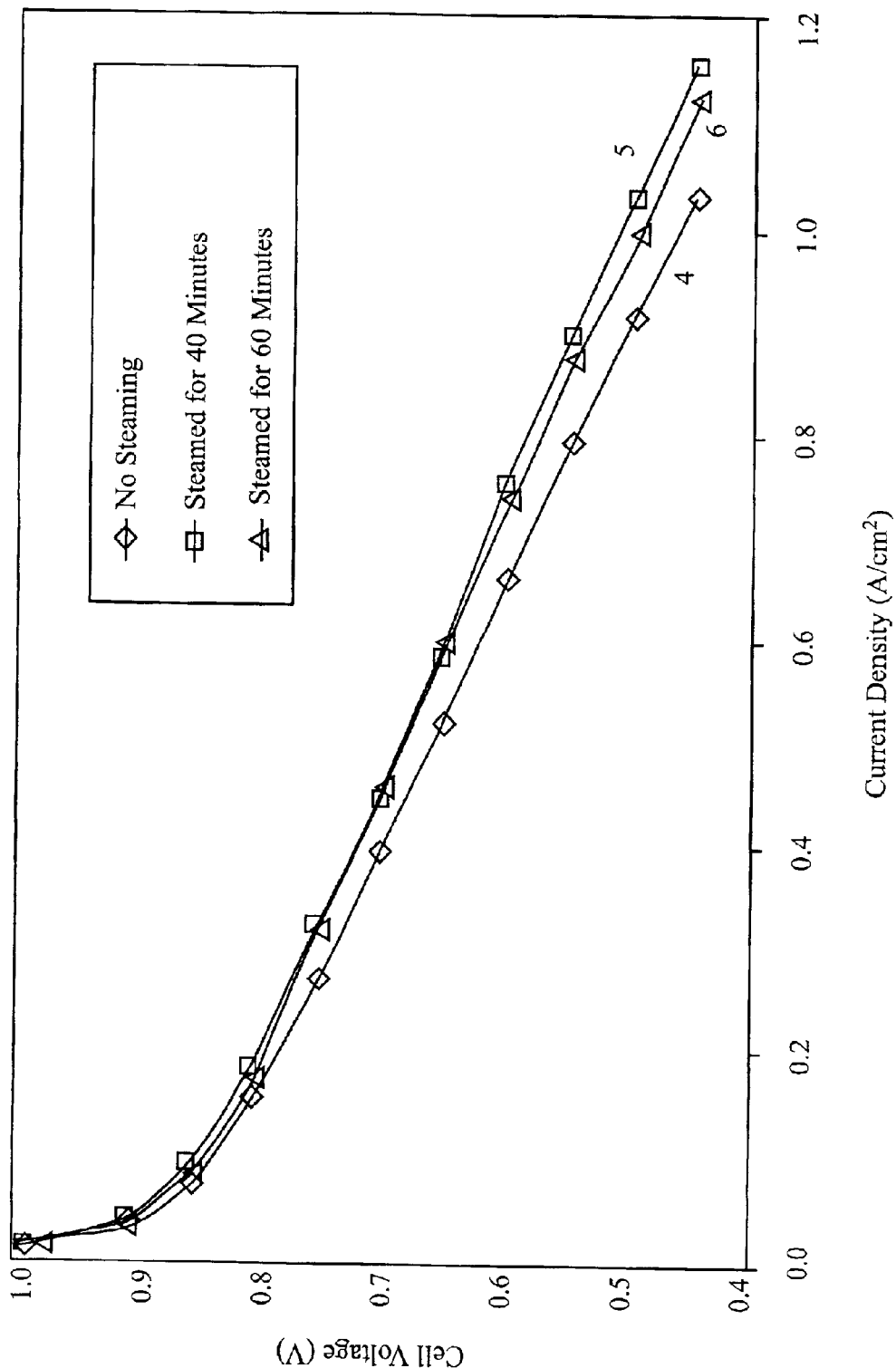
FIG. 2 illustrates a graph depicting the performances of CCMs having been steamed for 0, 40 and 60 minutes, respectively.

Referring to FIG. 2, the effect of steaming on the performance of a Catalyst Coated Membrane (CCM) is illustrated. The CCM had a reinforced membrane of ca. 25 $\mu$m thick, and a catalyst loading of 0.30 to 0.50 $mg/cm^2$ on each side. Gas diffusion media were attached (not bonded) to this catalyzed membrane during the testing. A performance increase in the entire current density region was observed after steaming (Curves 5 and 6 compared to Curve 4).

Figure 3:
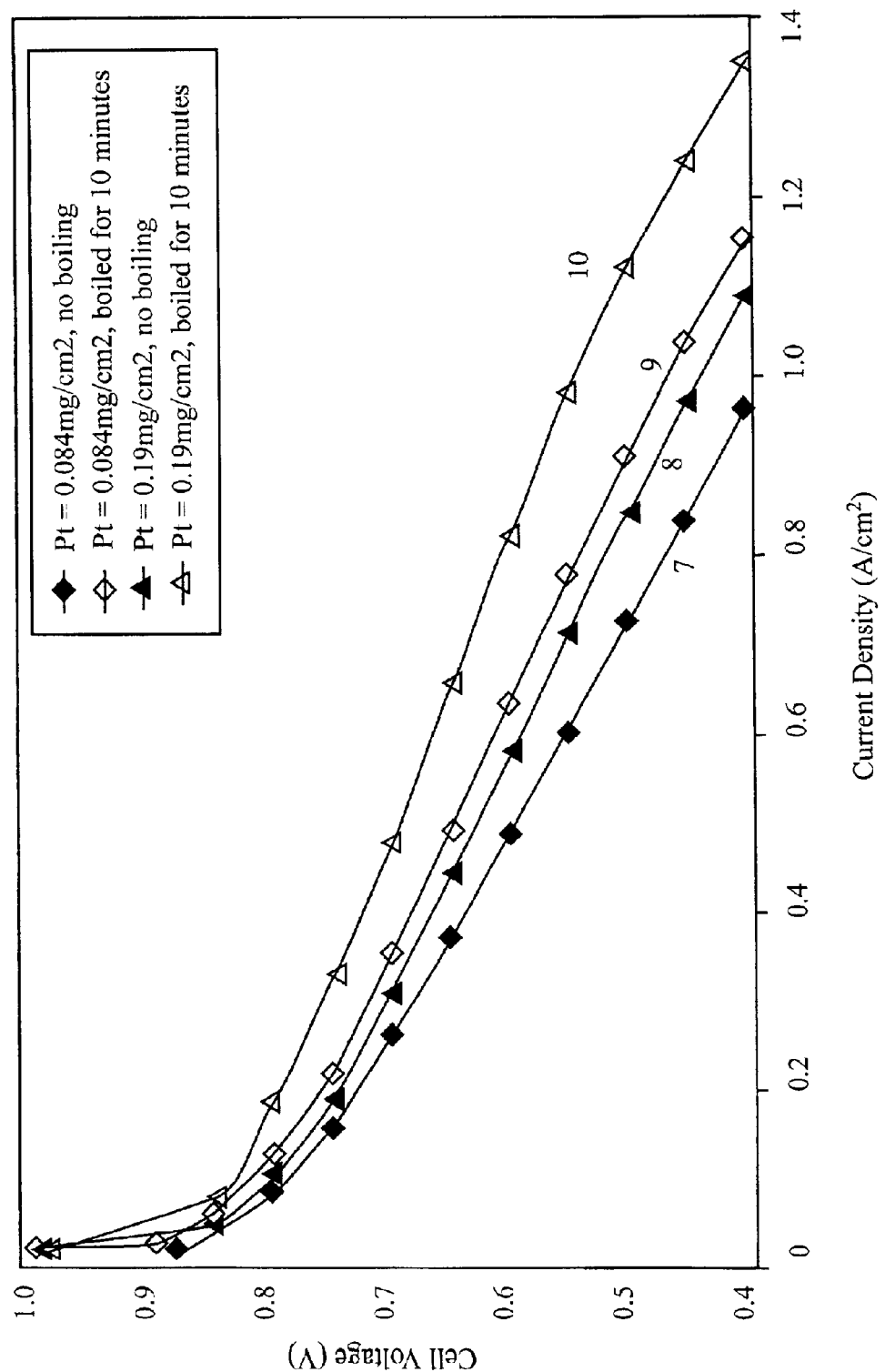
FIG. 3 shows a graph of the performances of electrodes having been boiled in water for 0 and 10 minutes, respectively.

Referring to FIG. 3, the effect of increased performance is illustrated for boiled electrodes. Electrodes with two different Pt loadings, 0.084 and 0.19 $mg/cm^2$, respectively, were tested. The electrodes were made from 40% Pt/C. A sizable increase was achieved for both Pt loading electrodes after a 10-minute boiling (Curves 9 and 10, as compared with Curves 7 and 8).

Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Having thus described the invention, what is desired to be protected by Letters Patent is presented in the subsequently appended claims.

What is claimed is:

1. A procedure for improving the performance of electrodes, catalyst-coated membranes (CCMs), and membrane-electrode assemblies (MEAs) in an electrochemical cell, said procedure comprising the steps of:

a) hydrating at least one of said electrodes, said CCMs and said MEAs in an aqueous solution containing at least one organic material at a temperature, at the boiling point thereof in order to enhance performance; and b) operating said electrochemical cell comprising at least one of said hydrated electrodes, CCMS, and MEAs, and observing said performance.

2. The procedure according to claim 1, wherein said hydrating step (a) does not exceed 30 minutes.

3. The procedure according to claim 1, wherein the aqueous solution is in the form of steam.

\* \* \* \* \*